US012044360B2

United States Patent
Schaich et al.

(10) Patent No.: US 12,044,360 B2
(45) Date of Patent: Jul. 23, 2024

(54) TANK DEVICE FOR STORING A GASEOUS MEDIUM

(71) Applicant: Robert Bosch GmbH, Stuttgart (DE)

(72) Inventors: Udo Schaich, Stuttgart (DE); Andreas Rau, Stuttgart (DE); Joerg Hahn, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 412 days.

(21) Appl. No.: 17/413,750

(22) PCT Filed: Nov. 18, 2019

(86) PCT No.: PCT/EP2019/081602
§ 371 (c)(1),
(2) Date: Jun. 14, 2021

(87) PCT Pub. No.: WO2020/120074
PCT Pub. Date: Jun. 18, 2020

(65) Prior Publication Data
US 2022/0049819 A1 Feb. 17, 2022

(30) Foreign Application Priority Data
Dec. 13, 2018 (DE) .................. 10 2018 221 602.9

(51) Int. Cl.
*F17C 13/04* (2006.01)
*F16K 31/06* (2006.01)
*F17C 1/00* (2006.01)

(52) U.S. Cl.
CPC .......... *F17C 13/04* (2013.01); *F16K 31/0651* (2013.01); *F16K 31/0655* (2013.01);
(Continued)

(58) Field of Classification Search
CPC ............. F17C 13/04; F17C 2205/0382; F17C 2205/0326; F17C 2205/0394;
(Continued)

(56) References Cited

U.S. PATENT DOCUMENTS 5,458,151 A 10/1995 Wass
6,032,833 A * 3/2000 Olegnowicz ........ B05B 11/1018
222/321.2
(Continued)

FOREIGN PATENT DOCUMENTS

DE 102018209057 A1 12/2019
JP 2005016709 A 1/2005
(Continued)

OTHER PUBLICATIONS

Translation of International Search Report for Application No. PCT/EP2019/081602 dated Feb. 18, 2020 (2 pages).

*Primary Examiner* — Stephen J Castellano
(74) *Attorney, Agent, or Firm* — Michael Best & Friedrich LLP

(57) ABSTRACT

A tank device for storing a gaseous medium, in particular hydrogen, includes a valve device and a tank. The valve device includes a valve housing having a longitudinal axis, in which valve housing an interior is formed. An actuation valve element is movable along the longitudinal axis and is arranged in the interior, which actuation valve element interacts with a valve seat in order to open and close an outlet opening and thus forms an actuation valve. The valve device includes a solenoid. The valve seat is formed downstream on the valve housing and at the outlet opening, and the cylindrical outlet opening leads into a cylindrical passage channel, the diameter D of the passage channel is greater than the diameter d of the outlet opening.

9 Claims, 1 Drawing Sheet

(52) U.S. Cl.
CPC .......... F17C 1/00 (2013.01); *F17C 2201/056* (2013.01); *F17C 2205/0326* (2013.01); *F17C 2205/0382* (2013.01); *F17C 2205/0394* (2013.01); *F17C 2221/012* (2013.01); *F17C 2223/0123* (2013.01); *F17C 2223/036* (2013.01); *F17C 2270/0168* (2013.01); *F17C 2270/0184* (2013.01)

(58) Field of Classification Search
CPC .......... F17C 2201/056; F17C 2221/012; F17C 2223/0123; F17C 2223/036
See application file for complete search history.

(56) References Cited

U.S. PATENT DOCUMENTS

| | | | |
|---|---|---|---|
| 10,041,601 B2* | 8/2018 | Wada | .................. F16K 27/0209 |
| 2006/0219298 A1 | 10/2006 | Suzuki | |
| 2011/0056472 A1* | 3/2011 | Stone | ...................... F17C 13/04 |
| | | | 220/581 |
| 2014/0239207 A1 | 8/2014 | Ninomiya et al. | |

FOREIGN PATENT DOCUMENTS

| | | | |
|---|---|---|---|
| JP | 2012233575 | A | 11/2012 |
| JP | 2016125472 | A | 7/2016 |
| JP | 2017057822 | A | 3/2017 |
| WO | 2015129159 | A1 | 9/2015 |
| WO | 2016146772 | A1 | 9/2016 |
| WO | 2016146773 | A1 | 9/2016 |

* cited by examiner

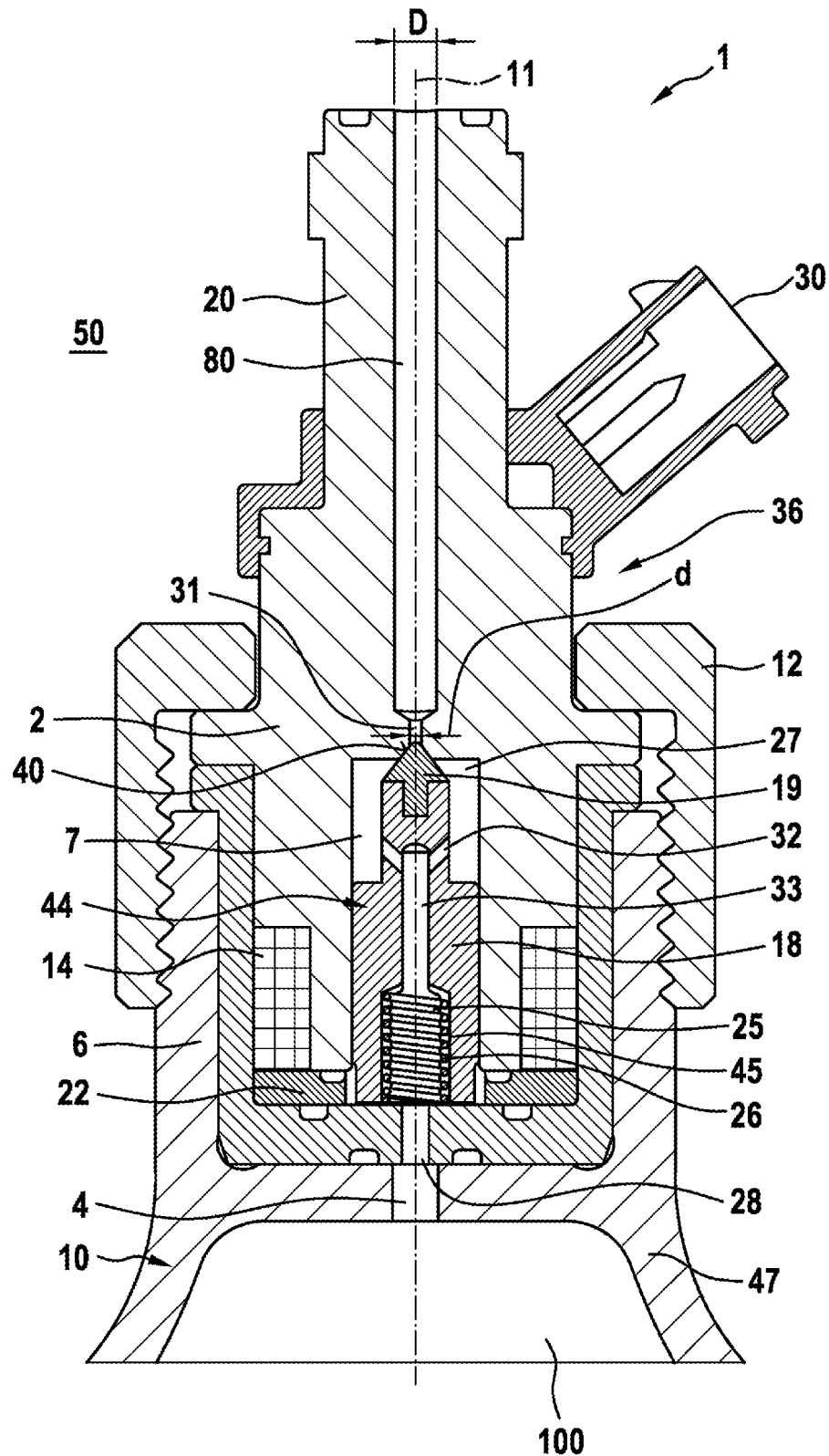

TANK DEVICE FOR STORING A GASEOUS MEDIUM

This application is the national stage (Rule 371) of international application No. PCT/EP2019/081602 filed 18 Nov. 2019.

BACKGROUND OF THE INVENTION

The invention relates to a tank device for a fuel cell tank, in particular for storing hydrogen, for example for use in vehicles with a fuel cell drive.

DE 10 2018 209 057 A1, which is not a prior publication, describes a tank device for thermally activated pressure relief of a fuel cell tank, wherein the tank device comprises tank containers with different valves, such as for example a shut-off valve, which ensure proper functioning for example of a fuel cell system.

The safety devices for such a tank device are standardized. Here, each tank device must have such a shut-off valve. In this way, in the event of damage to the tank device caused by an accident involving a vehicle with a fuel cell drive or in the event of breakage of a line of the tank device, the shut-off valve can close off the tank containers so that no gas can escape from the storage unit.

The multiplicity of the valves can thus lead to a complex and cost-intensive tank device.

SUMMARY OF THE INVENTION

The tank device according to the invention has by contrast the advantage that the respective safety valve has a compact, low-cost construction, wherein the high safety requirements concerning gas impermeability are met at all times.

For this purpose, the tank device for storing a gaseous medium, in particular hydrogen, has a valve device and a tank. The valve device has a valve housing with a longitudinal axis, in which valve housing there is formed an interior space. In the interior space, there is arranged an actuation valve element which is movable along the longitudinal axis, which actuation valve element interacts with a valve seat for opening and closing an outlet opening and thus forms an actuation valve. The valve device furthermore comprises a magnet coil. Furthermore, the valve seat is formed downstream on the valve housing and at the outlet opening, and the cylindrical outlet opening opens out into a cylindrical passage channel, wherein a diameter D of the passage channel is greater than a diameter d of the outlet opening.

In this way, it is possible to achieve a compactly constructed, single-switching safety solenoid valve which, owing to the integrated design, meets the safety requirements and achieves a cost saving.

In a first advantageous refinement, it is provided that the passage channel transitions into the outlet opening by means of a conical transition region.

In a further configuration of the invention, it is advantageously provided that the tank has a neck region, in which neck region the valve device is arranged. The tank device advantageously has an encasing element, by way of which encasing element the valve device is integrated firmly in the neck region of the tank and sealed off with respect to surroundings. In this way, the robustness of the complete tank device can be ensured, since high stability can be achieved by the integration of the valve device into the tank. The valve device is protected from external influences even in the event of an accident.

In a further configuration of the invention, it is advantageously provided that a passage opening is formed in the neck region, wherein the passage opening opens out into the tank interior. This leads to greater robustness of the complete tank, in particular in the event of an accident.

In an advantageous refinement, the interior space of the valve housing can be connected to a tank interior space by means of an inlet opening formed in the valve housing. In this way, the flow cross section of gaseous medium from the tank can be controlled in a simple manner.

In a further configuration of the invention, it is advantageously provided that, in a cutout of the actuation valve element, there is arranged a spring and there is formed a spring space, by way of which spring the main valve element is loaded by a force in the direction of the valve seat. In this way, when the magnet coil is not electrically energized, the leak-tightness of the valve device is ensured.

In an advantageous refinement, the actuation valve element has a longitudinal opening and further openings, which longitudinal opening and which further openings are connected fluidically to the spring space. In this way, the inlet opening can be connected to the outlet opening of the valve device in an optimal manner.

In a further configuration of the invention, it is advantageously provided that a sealing body is arranged on the actuation valve element, which sealing body has a hemispherical tip. The sealing body is advantageously made of a plastic.

In a further configuration of the invention, it is advantageously provided that the valve seat is of conical form, wherein the valve seat interacts with the hemispherical tip of the sealing body for opening and closing the outlet opening. In this way, a high degree of leak-tightness at the valve seat can be achieved.

The tank device described is preferably suitable in a fuel cell arrangement for storing hydrogen for the operation of a fuel cell.

BRIEF DESCRIPTION OF THE DRAWINGS

The drawing illustrates exemplary embodiments of a tank device according to the invention for storing a gaseous medium, in particular hydrogen.

FIG. 1 shows an exemplary embodiment of a tank device according to invention with a valve device in a longitudinal section.

DETAILED DESCRIPTION

FIG. 1 shows an exemplary embodiment of a tank device 1 according to the invention for a gaseous medium. The tank device 1 has a tank 10 and a valve device 2. The tank 10 has a tank housing 47 in which a tank interior space 100 is formed. The tank housing 47 furthermore comprises a neck region 6, which has a base region in which a passage opening 4 is formed. At one end, said passage opening 4 opens out into the tank interior space 100, in which gaseous medium, for example hydrogen, can be stored.

At the other end of the neck region 6, the valve device 2 is arranged in the passage opening 4 of the tank 10 and is integrated into the tank housing 47 of the tank 10. The neck region 6 is moreover surrounded by an encasing element 12 such that the valve device 2 and the tank interior space 100 are sealed off from surroundings 50.

Gaseous medium, in particular hydrogen, can then be fed via a cylindrical passage channel 80 for example to an anode region of a fuel cell in a fuel cell arrangement from the tank interior 100 via the valve device 2.

The valve device 2 has a valve housing 20 with a longitudinal axis 11, in which valve housing a stepped interior space 7 is formed. In the valve housing 20, the valve device 2 has a cylindrical inlet opening 28 and a cylindrical outlet opening 31, wherein the inlet opening 28 opens out into the passage opening 4 of the tank 10 in the neck region 6. Both the flow into and the flow out of the valve device 2 are realized here axially with respect to the longitudinal axis 11 of the valve device 2.

Furthermore, a magnet coil 14 is accommodated and integrated in the valve housing 20, wherein the magnet coil 14 is fixed in the valve housing 20 by means of a support element 22 and is sealed off with respect to the interior space 7 by means of a sealing element 32 on the support element 22. Here, the magnet coil 14 can be activated via an electrical connection 30.

An actuation valve element 18 which is movable along the longitudinal axis 11 is arranged in the interior space 7. The actuation valve element 18 and the valve housing 20 delimit an annular space 27 and a spring space 25. Here, the annular space 27 opens out into the outlet opening 31, whereas the spring space 25 opens out into the inlet opening 28.

A sealing body 19 is arranged on the actuation valve element 18 and, together with a valve seat 40 formed conically on the valve housing 20, forms an actuation valve 44. The sealing body 19 has a hemispherical tip, by way of which it bears on the valve seat 40, and is preferably made of a plastic. The actuation valve 44 allows a connection between the annular space 27 and the outlet opening 31, and thus the passage channel 80, to be opened and closed.

Here, the passage channel 80 opens out into the outlet opening 31 by means of a conical transition region 36, wherein the passage channel 80 has a diameter D and the outlet opening 31 has a diameter d. The diameter D of the passage channel 80 is greater than the diameter d of the outlet opening 31.

A longitudinal opening 33 and further openings 32 are formed in the actuation valve element 18. The further openings 32 open out into the annular space 27, and the longitudinal opening 33 opens out at one side into the further openings 32 and at the other side into the spring space 25.

The actuation valve element 18 furthermore has a cutout 45 which is connected to the longitudinal opening 33. In the cutout 45, there is formed the spring space 25 and there is arranged a spring 26 which is supported at one side against the valve housing 20 and at the other side against the actuation valve element 18 and which pushes the actuation valve element 18 in the direction of the valve seat 40.

Here, the valve housing 20 is of multi-part form such that the magnet coil 14 is accommodated and integrated in an interposed manner with respect to the multi-part valve housing 20.

Functioning of the Valve Device

If the magnet coil 14 is not electrically energized, the valve seat 40 is closed by the force of the spring 26, with the result that the connection between the inlet opening 28 and the outlet opening 31 is closed. Consequently, it is also the case that no gaseous medium can flow from the tank interior space 100 in the direction of a system, for example the fuel cell arrangement, via the actuation valve 44. High pressure of for example 700 bar prevails in the tank interior space 100. By contrast, low pressure prevails in the fuel cell arrangement.

If the magnet coil 14 is electrically energized, then a magnetic field is formed, which leads to an action of force between the valve housing 20 and the actuation valve element 18. Consequently, a magnetic force on the actuation valve element 18 that is directed counter to the force of the spring 26 and to the pressure forces generated by the gaseous medium is generated. This leads to the actuation valve element 18 lifting off from the valve seat 40 and opening up the latter. The connection between the inlet opening 28 and the outlet opening 31 is then opened up. Gaseous medium then flows, via the inlet opening 28, the spring space 25, the longitudinal opening 33 and the further openings 32, the annular space 27 and the outlet opening 31, from the tank interior space 100 into the passage channel 80 in the direction of the system.

If it is intended for the supply of hydrogen to the fuel cell to be interrupted, the magnet coil 14 is no longer electrically energized, with the result that the magnetic force is reduced and the actuation valve element 18, by means of the force of the spring 26, is moved in the direction of the valve seat 40, and closes the latter, again.

The diameter d of the outlet opening 31, the diameter D of the passage channel 80 and the stroke of the main valve element 16 are advantageously configured in such a way that the fuel cell is provided with a sufficient mass flow of hydrogen in all operating states. Here, the diameter D of the passage channel 80 is greater than the diameter d of the outlet opening 31.

Moreover, in this way, in the case of the tank 10 being filled with gaseous medium, hydrogen in this case, in which the flow direction is from the outlet opening 31 in the direction of the inlet opening 28, the tank 10 can be filled in a short period of time, for example in a few minutes.

What is claimed is:

1. A tank device (1) for storing a gaseous medium, the tank device having a valve device (2) and having a tank (10), wherein the valve device (2) has a valve housing (20) with a longitudinal axis (11), in which valve housing (20) there is formed an interior space (7), in which interior space (7) there is arranged an actuation valve element (18) which is movable along the longitudinal axis (11), which actuation valve element (18) interacts with a valve seat (40) for opening and closing an outlet opening (31) and thus forms an actuation valve (44), wherein the valve device (2) comprises a magnet coil (14), wherein the valve seat (40) is formed downstream on the valve housing (20) and at the outlet opening (31), and the outlet opening (31) opens out into a cylindrical passage channel (80), wherein a diameter D of the passage channel (80) is greater than a diameter d of the outlet opening (31), wherein the tank (10) has a neck region (6), in which neck region (6) the valve device (2) is arranged, the neck region (6) further including a partition having a bottom surface exposed to a tank interior space (100) and a top surface abutting the valve housing (20), wherein a passage opening (4) is formed in the partition and extends from the top surface to the bottom surface, wherein the interior space (7) of the valve housing (20) is configured to be connected to the tank interior space (100) by an inlet opening (28) formed in the valve housing (20), wherein the inlet opening (28) is in fluid communication with the passage opening (4).

2. The tank device (1) as claimed in claim 1, wherein the passage channel (80) transitions into the outlet opening (31) via a conical transition region (36).

3. The tank device (1) as claimed in claim 1, wherein the tank device (1) has an encasing element (12), by way of which encasing element (12) the valve device (2) is integrated firmly in the neck region (6) of the tank (10) and sealed off with respect to surroundings (50).

4. The tank device (1) as claimed in claim 1, wherein, in a cutout (45) of the actuation valve element (18), there is arranged a spring (26) and there is formed a spring space (25), by way of which spring (26) the actuation valve element (18) is loaded by a force in a direction of the valve seat (40).

5. The tank device (1) as claimed in claim 4, wherein the actuation valve element (18) has a longitudinal opening (33) and further openings (32), which longitudinal opening (33) and which further openings (32) are connected fluidically to the spring space (25).

6. The tank device (1) as claimed in claim 1, wherein a sealing body (19) is arranged on the actuation valve element (18), which sealing body (19) has a hemispherical tip.

7. The tank device (1) as claimed in claim 6, wherein the sealing body (19) is made of a plastic.

8. The tank device (1) as claimed in claim 6, wherein the valve seat (40) is of conical form, wherein the valve seat (40) interacts with the hemispherical tip of the sealing body (19) for opening and closing the outlet opening (31).

9. A fuel cell arrangement having a tank device (1) as claimed in claim 1 for storing hydrogen for the operation of a fuel cell.

* * * * *